US008392475B2

(12) United States Patent
Pire et al.

(10) Patent No.: US 8,392,475 B2
(45) Date of Patent: Mar. 5, 2013

(54) METHOD AND A DEVICE FOR FLYING SAFELY AT LOW ALTITUDE IN AN AIRCRAFT

(75) Inventors: Richard Pire, Istres (FR); Francois-Xavier Filias, Pelissanne (FR)

(73) Assignee: Eurocopter, Marignane Cedex (FR)

( * ) Notice: Subject to any disclaimer, the term of this patent is extended or adjusted under 35 U.S.C. 154(b) by 75 days.

(21) Appl. No.: 13/043,900

(22) Filed: Mar. 9, 2011

(65) Prior Publication Data

US 2011/0225212 A1 Sep. 15, 2011

(30) Foreign Application Priority Data

Mar. 15, 2010 (FR) ..................................... 10 01024

(51) Int. Cl.
*G06F 17/30* (2006.01)

(52) U.S. Cl. ................ 707/812; 701/3; 701/9; 701/301; 342/149

(58) Field of Classification Search .................. 707/812, 707/E17.005; 701/3, 4, 9, 13, 301, 467; 342/29, 342/38, 50, 149; 348/61, 143, 148
See application file for complete search history.

(56) References Cited

U.S. PATENT DOCUMENTS 3,069,654 A 12/1962 Hough
3,273,148 A * 9/1966 Wood et al. .................... 342/149
4,247,843 A * 1/1981 Miller et al. ................... 340/973
4,646,244 A * 2/1987 Bateman et al. .............. 701/301
4,737,788 A * 4/1988 Kennedy ......................... 342/29
4,812,990 A * 3/1989 Adams et al. ...................... 701/3
5,086,396 A * 2/1992 Waruszewski, Jr. .......... 701/458
5,296,909 A 3/1994 Fazi et al.
5,442,556 A * 8/1995 Boyes et al. ...................... 701/9
5,488,563 A * 1/1996 Chazelle et al. .............. 701/301
5,526,000 A * 6/1996 Chazelle et al. .............. 342/407
5,638,282 A * 6/1997 Chazelle et al. .............. 701/301
(Continued)

FOREIGN PATENT DOCUMENTS

FR 2736149 A1 1/1997
FR 2895098 A1 6/2007
(Continued)

OTHER PUBLICATIONS

M. J. Dorsett and R. M. Wyskida—"A minimum-exposure, minimum-elevation military aircraft heuris tic route selection model"—Applied Math. Modelling, 1985, vol. 9, April—pp. 131-138.*

(Continued)

*Primary Examiner* — Anh Ly
(74) *Attorney, Agent, or Firm* — Brooks Kushman P.C.

(57) ABSTRACT

The present invention relates to a method of flying safely and at low altitude in an aircraft, in which method unsafe relief (R0) of terrain is determined as is the position of at least one high point (4, 5) representing an obstacle (4', 5') overlying said unsafe relief (R0). A main volume (V0) is added to said unsafe relief (R0), the main volume being defined between a main volume base (2) placed on the unsafe relief (R0) and an envelope (1), thereby obtaining safe relief (R1) for overflying that contains at least said unsafe relief (R0) and said main volume (V0), said main volume base (2) having an area (2') defined by a closed peripheral curve (3) resting on said unsafe relief (R0), said envelope (1) being generated using a moving segment (S) of predetermined length (L) extending from said high point (4, 5) to a second point (3') moving along said peripheral curve (3).

10 Claims, 1 Drawing Sheet

U.S. PATENT DOCUMENTS

| | | | | |
|---|---|---|---|---|
| 5,762,292 | A | 6/1998 | Schweyer et al. | |
| 5,890,079 | A * | 3/1999 | Levine | 701/14 |
| 5,892,462 | A * | 4/1999 | Tran | 340/961 |
| 6,216,065 | B1 * | 4/2001 | Hall et al. | 701/16 |
| 6,243,482 | B1 * | 6/2001 | Eibert et al. | 382/103 |
| 6,747,576 | B2 | 6/2004 | Schaefer | |
| 7,295,134 | B2 * | 11/2007 | Jourdan et al. | 340/963 |
| 7,428,451 | B2 * | 9/2008 | Artini et al. | 701/9 |
| 7,783,394 | B2 * | 8/2010 | Artini | 701/4 |
| 7,881,866 | B2 | 2/2011 | Meunier et al. | |
| 2001/0023390 | A1 * | 9/2001 | Gia | 701/301 |
| 2003/0043058 | A1 * | 3/2003 | Jamieson et al. | 340/961 |
| 2003/0046025 | A1 * | 3/2003 | Jamieson et al. | 702/159 |
| 2003/0107499 | A1 * | 6/2003 | Lepere et al. | 340/945 |
| 2003/0225489 | A1 | 12/2003 | Tsao | |
| 2004/0178943 | A1 * | 9/2004 | Niv | 342/29 |
| 2004/0225420 | A1 * | 11/2004 | Morizet et al. | 701/3 |
| 2004/0267413 | A1 | 12/2004 | Keber | |
| 2005/0258979 | A1 * | 11/2005 | Artini et al. | 340/970 |
| 2005/0261811 | A1 * | 11/2005 | Artini et al. | 701/3 |
| 2005/0273223 | A1 * | 12/2005 | Artini et al. | 701/9 |
| 2007/0171094 | A1 | 7/2007 | Alter et al. | |
| 2007/0265776 | A1 | 11/2007 | Meunier et al. | |
| 2008/0243383 | A1 * | 10/2008 | Lin | 701/213 |
| 2008/0281522 | A1 * | 11/2008 | Subelet | 701/301 |
| 2010/0305859 | A1 * | 12/2010 | Fogarty et al. | 702/2 |
| 2011/0225212 | A1 * | 9/2011 | Pire et al. | 707/812 |

FOREIGN PATENT DOCUMENTS

| | | | |
|---|---|---|---|
| JP | 1123711 | A | 5/1989 |
| JP | 1123712 | A | 5/1989 |

OTHER PUBLICATIONS

Thomas Netter and Nicolas Franceschini—"A Robotic Aircraft that Follows Terrain Using a Neuromorphic Eye"—Prcceedings of tne 2002 IEEURSI International Conference on Intelligent Robots and Systems EPFL. LaJsanne. Switzerland Oct. 2002—(pp. 129-134).*

Search Report and Written Opinion; Application No. FR1001024; dated Nov. 26, 2010.

Zhao, M. et al. "A Method to Identify Flight Obstacles on Digital Surface Model", Tsinghua Science and Technology, Tsinghua University Press, Beijing, CN, vol. 10, No. 3, Jun. 1, 2005, pp. 323-327, XPO22932881, ISSN: 1007-0214, DOI: 10.1016/S1007-0214(05)70076-6.

Japanese Patent Office Letter, for corresponding JP Application No. 2011-046032, mailed Aug. 21, 2012.

* cited by examiner

METHOD AND A DEVICE FOR FLYING SAFELY AT LOW ALTITUDE IN AN AIRCRAFT

CROSS REFERENCE TO RELATED APPLICATIONS

This application claims the benefit of FR 10 01024 filed on Mar. 15, 2010, the disclosure of which is incorporated in its entirety by reference herein.

BACKGROUND OF THE INVENTION (1) Field of the Invention

The present invention relates in general to a method and a device for flying safely at low altitude in an aircraft in spite of wire and non-wire obstacles, by making use of detector means.

(2) Description of Related Art

More particularly, and in non-limiting manner, the detector means are of the radar or laser or stereoscopy telemeter type. It is recalled that remote detection by laser, known as light detection and ranging (lidar) makes use of laser light returned to the emitter.

An object is detected by measuring the time delay between emitting a signal and detecting the reflected signal, the signal being constituted by radio waves when using radar or by light rays when using lidar.

From images delivered by detector means producing plots of individual echoes, it is known to obtain a terrain elevation database for the zone observed by the detector means. The database includes all of the relief and the obstacles.

Nevertheless, it is observed that failure to detect cables or other suspended wire obstacles lies behind numerous flying accidents, and reduces the domain in which aircraft, and in particular helicopters, can fly safely when close to the ground.

Patents FR 2 736 149 and U.S. Pat. No. 5,762,292 already make proposals for a system that recognizes structures that present rectilinear portions in an image delivered by a sensor on board a flying machine, by making use of a parametric transform (Hough transform) of a portion of the image.

The Hough transform, described in U.S. Pat. No. 3,069,654, serves to detect a set of aligned points in an image.

U.S. Pat. No. 5,296,909 proposes detecting the presence of cables by using a scanning laser telemeter (lidar) that delivers plots, where each plot corresponds to a point in three-dimensional space characterized by its three spatial coordinates, specifically spherical coordinates given as elevation, relative bearing, and range: the telemeter sends laser pulses that make it possible, by measuring their round-trip times, to obtain points that are positioned in three-dimensional (3D) space. The echoes are filtered. A set of parameters is determined by the Hough transform for all possible groups of filtered echoes. Clusters of points in parameter space are identified, and the position of a cable is determined by the inverse Hough transform.

Proposals are also made in U.S. Pat. No. 6,747,576 to detect the presence of electricity lines by forming a cloud of measurement points in a terrestrial frame of reference on the basis of data delivered by a remote detector sensor and data from a navigation system, with measurement points that represent the ground being eliminated therefrom. The method then includes a search for straight lines amongst the projections of the measurement points onto the horizontal plane, by using two successive Hough transforms: a "pure" transform using a delta function (or Dirac function), followed by a "fuzzy" transform in which the delta function is replaced by a Gaussian distribution. Thereafter, a search is made for catenaries in each vertical plane containing one of the straight lines found in that way, this search also making use of two successive Hough transforms.

In order to search for a catenary corresponding to the equation:

$$[z=a^{*}\cos h((\lambda-b)/a)+c]$$

for each measurement point of each vertical plane, and for each possible value of a catenary parameter a, a two-dimensional Hough transform is calculated (in the b and c parameter space) for catenaries passing via that point.

The document "Automatic extraction of vertical obstruction information from interferometric SAR elevation data" by Donald Woods et al. (IEEE publication: IGARSS 2004 Congress) provides a method of calculating the height and the location of vertical obstacles from a digital terrain model enabling high points to be extracted.

Those various devices are effective. Nevertheless, active sensors for detecting obstacles are limited in particular by the technique used for detecting wire obstacles, since it is not capable of detecting wire obstacles from below a threshold angle of incidence for the emitted signal relative to the wire obstacle, where said angle of incidence is about 15° with radar and about 60° with lidar. As from that angle of incidence, reflection becomes specular and it is no longer possible to detect cables.

Present-day terrain elevation databases do not make it possible to fly any closer to the ground since there is no guarantee that wire obstacles will be detected. The pilot is thus obliged to fly higher above the ground so as to leave a safety margin.

Systems using obstacle databases exist, but they are not complete, they are not guaranteed by their constructors, and they are provided for information purposes only.

It should be observed that the state of the art also includes the following documents: US 2007/171094, US 2003/225489, FR 2 895 098, US 2004/267413, and the article by M. Zhao et al.: "A method to identify flight obstacles on digital surface model" (Tsinghua Science and Technology, Tsinghua University Press, Beijing, China, Vol. 10, No. 3, Jun. 1, 2005).

SUMMARY OF THE INVENTION

An object of the present invention is thus to propose a device enabling the above-mentioned limitations to be overcome. According to the invention, a method of preparing a safe database for flying safely at low altitude in an aircraft is remarkable in particular in that it comprises the following steps:

- determining unsafe relief of said terrain and determining the position of at least one high point representing an obstacle overlying said unsafe relief, by making use of a primary database of said terrain containing said unsafe relief and said obstacle; and
- adding to said unsafe relief a main volume that is defined between a main volume base placed on the unsafe relief and an envelope, so as to obtain safe relief for overflying that contains at least said unsafe relief and said main volume, said main volume base having an area defined by a closed peripheral curve resting on said unsafe relief, said envelope being generated using a moving segment of predetermined length extending from said high point to a second point that moves along said peripheral curve.

Under such circumstances, flying is performed while making use of the safe database.

It should be observed that the term "unsafe relief" relates to the surface that represents the ground of the terrain. The relief is said to be unsafe insofar as it makes no mention of wire or non-wire obstacles that might be struck by a flying aircraft.

Thus, use is made initially of a primary database in order to extract the unsafe relief and the high points that represent obstacles overlying the ground and thus the unsafe relief.

Thereafter, starting from at least one high point, a main volume is constructed between the unsafe relief and the high point. Preferably, but not necessarily, a main volume is constructed from each high point.

The main volume is constructed using a generator line of the type comprising a segment between two end points, i.e. a first end point being fixed and situated at the selected high point, and a second end point being a moving second point for constructing an envelope. The second end point is then moved along a peripheral curve following the unsafe relief and defining the base of the main volume. The main volume is thus a cone, the base of the main volume in the form of a cone rests on the unsafe relief and thus possesses a shape that may be a complex three-dimensional shape.

If the relief is plane, it will be understood that the base of the main volume is circular.

The segment at the origin of each main volume then represents a cable that might extend from a high point. According to the invention, it is considered that each high point is potentially the top of an upright, e.g. an electricity pylon or post carrying electric cables.

Under such circumstances, all of the main volume that might contain an electric cable is excluded from the flying domain. By constructing relief that is safe relative to wire and non-wire obstacles, low altitude flight is made safe.

Consequently, safe relief is constructed as a result in particular of combining determined main volumes and the extracted unsafe relief.

It should be observed that the safe relief may be determined on the ground, or indeed in real time while in flight.

In other aspects, the method of the invention may include additional characteristics.

For example, when there is a maximum distance that can exist between a first upright and a second upright connected to the first upright by a wire obstacle constituted by an electricity line, then the predetermined length is equal to that maximum distance. For example, the predetermined length may be equal to 300 meters.

Optionally, at least two high points overlie the relief, a link line connects together the two high points, the link line having a predetermined thickness and a link length that is shorter than the predetermined length, and a secondary volume is added to the unsafe relief, the secondary volume lying between the link line and an orthogonal projection of the link line onto the unsafe relief in order to optimize the safe relief.

Furthermore, in a first implementation, use is made of a previously-constructed primary database, i.e. an unsafe database that has already been constructed and that includes the obstacles.

In a second implementation, the primary database is itself prepared. Thus, use is made of a secondary database containing solely the unsafe relief, and the secondary database is enriched with obstacles as detected by obstacle detector means so as to obtain the primary database.

Consequently, obstacle detector means of the radar, lidar, or indeed sonar type are used for detecting obstacles overlying the ground, i.e. the unsafe relief, and the obstacles and the unsafe relief are stored together on a memory in order to construct the primary database.

The primary database may be constructed on the ground after performing one or more obstacle-search flights, or indeed it may be constructed in real time in flight.

In another aspect, a protection volume is added to the unsafe relief, the protection volume being determined and positioned by an operator in order to optimize said safe relief. For example, the pilot might decide to exclude a zone from flight manually either before or during flight, possibly in order to avoid a zone presenting difficult atmospheric conditions.

In addition, said safe relief is recorded in order to provide a reusable safe database of said terrain that includes wire and non-wire obstacles. This characteristic is particularly advantageous when the safe relief is established in real time while in flight. Storing this safe relief makes it possible in particular for it to be reused subsequently.

The invention also provides a device for making a safe database in order to fly safely at low altitude in an aircraft, the device being suitable for implementing the method. The device comprises:

- a primary database comprising at least unsafe relief of terrain for overflying and an obstacle overlying said unsafe relief; and
- a primary computer for adding at least one main volume to said unsafe relief, the main volume being defined between a main volume base placed on the unsafe relief and by an envelope, thereby obtaining safe relief for overflying containing at least said unsafe relief and said main volume, said main volume base having an area defined by a closed peripheral curve resting on said unsafe relief, said envelope being generated by using a moving segment of a predetermined length extending from a high point representing said obstacle to a second point that moves along said peripheral curve.

By way of example, the primary computer is a processor or a microprocessor, possibly including a memory, or any other equivalent means.

The device may be arranged at least in part in an aircraft or on the ground.

Furthermore, the device may comprise:

- a secondary database containing solely said unsafe relief;
- active obstacle detector means; and
- a secondary computer for enriching said secondary database with obstacles detected by the obstacle detector means in order to obtain said primary database.

By way of example, the secondary computer is a processor or a microprocessor, optionally including a memory, or any other equivalent means. The obstacle detector means may be of the lidar, radar, or indeed sonar type.

The obstacle detector means may also possess a detector as such, together with a possibly remote storage memory that stores obstacles that have been detected.

The other elements of the device may be arranged in an aircraft or on the ground.

Finally, the device may include interface means to enable an operator to add a protection volume to the unsafe relief, the protection volume being determined and positioned by said operator in order to optimize said safe relief.

BRIEF DESCRIPTION OF THE DRAWINGS

The invention and its advantages appear in greater detail from the following description of embodiments given by way of illustration with reference to the accompanying figures, in which.

Elements present in more than one of the figures are given the same references in each of them.

DETAILED DESCRIPTION OF THE PREFERRED EMBODIMENTS

Figure 1:
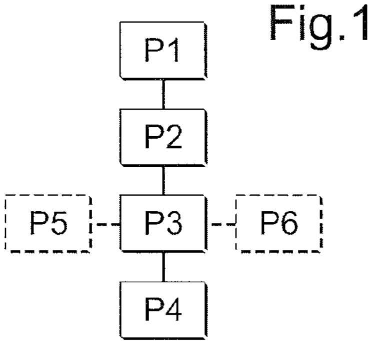
FIG. 1 is a diagram explaining the method of the invention.

FIG. 1 shows the method of the invention.

In a first step P1, unsafe relief is determined.

Furthermore, during a second step P2, optionally performed in parallel to the first step P1, at least one high point is determined representing an obstacle overlying the ground and thus the unsafe relief.

In order to perform the first and second steps P1 and P2, a primary database is used containing at least unsafe relief of the terrain for overflying and the obstacles overlying the unsafe relief.

In a first implementation, use is made of a primary database, optionally one that is commercially available.

In a second implementation, a primary database is established from a secondary database containing the unsafe relief of the terrain and enriched with obstacles that have been detected by obstacle detector means in order to obtain said primary database, the secondary database being commercially available or obtained by conventional methods.

In a third step P3, it is considered that each high point might be connected to a wire obstacle. Under such circumstances, a main volume is added to said unsafe relief in order to obtain safe relief that can be overflown without danger. This safe relief thus contains at least one item of unsafe relief and all of the added main volumes.

Figure 2:
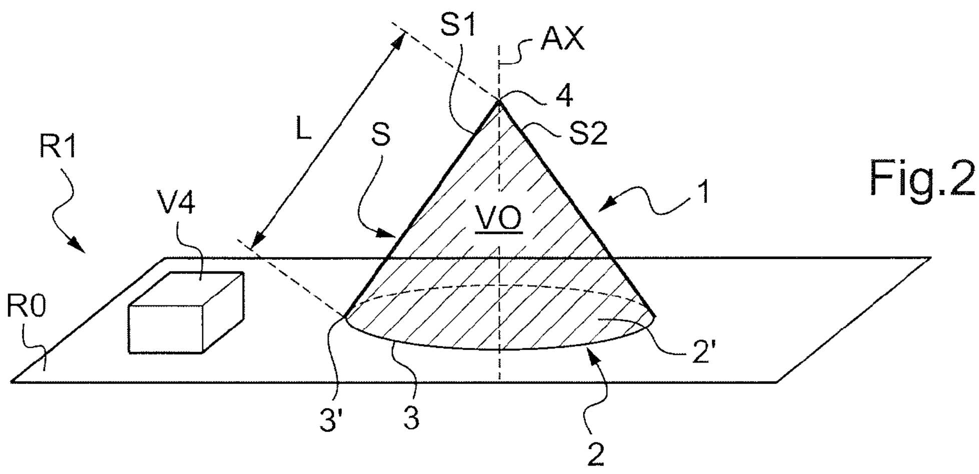
FIG. 2 is a diagram explaining the construction of a primary volume.

With reference to FIG. 2, it should be observed that each main volume V0 is defined firstly by a base 2 of the main volume placed on the unsafe relief R0, and secondly by an envelope 1.

The base 2 of the main volume has an area 2' defined by a closed peripheral curve 3 resting on the unsafe relief R0.

In addition, the envelope 2 is generated using a moving segment S having two positions S1 and S2 shown in FIG. 2, the moving segment having a predetermined length L. Furthermore, since each wire obstacle extending between a first upright and a second upright, such as first and second electricity poles, extends over a distance not exceeding a maximum distance defined by standards, the predetermined distance taken into consideration is equal to said maximum distance.

In order to construct the main volume V0, a first end point of the segment is placed on the high point 4 and the second end point 3' of the segment is allowed to rest on the unsafe relief R0. The segment is used as a generator line by causing the segment S to sweep over the unsafe relief R0 around an axis AX extending in the gravity direction, while taking care to maintain the second end point 3' on the unsafe relief R0. The second end point 3' is then a second moving point of the segment S and it travels around the peripheral curve 3 of the base 2 of the main volume.

When the unsafe relief is flat, for example as shown in FIG. 2, the base of the main volume V0 in the form of a cone is circular and it presents circular symmetry.

Figure 3:
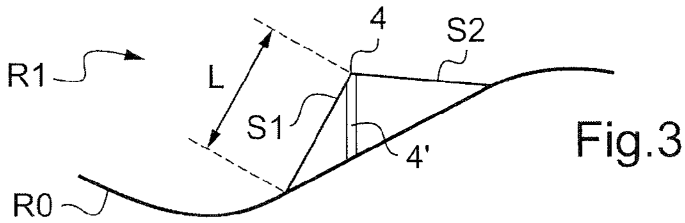
FIG. 3 is a section showing the construction of a primary volume on rough terrain.

Nevertheless, with reference to FIG. 3, when the unsafe relief is rough, e.g. over the side of a hill, the base of the main volume may have any other shape.

By adding each main volume V0 to the unsafe relief, safe relief R1 is obtained.

With reference to FIG. 1, and in accordance with an optional step P5, a protection volume is added to the unsafe relief.

With reference to FIG. 2 the protection volume V4 is determined and positioned by an operator.

This protection volume may serve to avoid a zone in which overflying is forbidden or indeed a zone that is subjected to very bad weather, for example.

With reference to FIG. 1, when two high points overlie the unsafe relief, with a link line interconnecting these two high points presenting a link length that is shorter than the predetermined length, it is possible that the two high points are connected by a wire obstacle. Under such circumstances, during an optional step P6, a secondary volume is added to the unsafe relief in order to exclude such wire obstacles.

Figure 4:
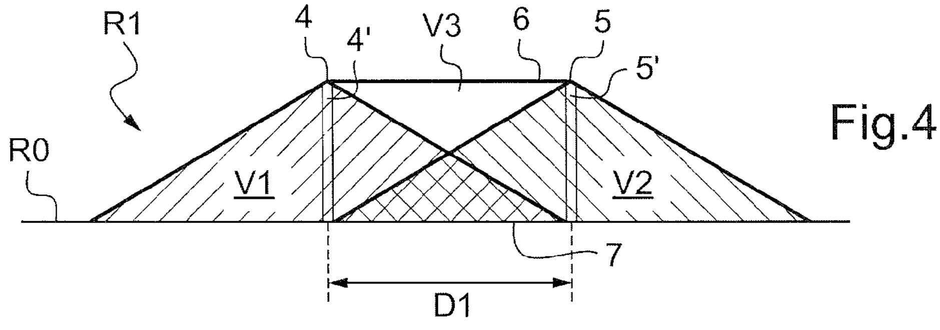
FIG. 4 is a section explaining a variant of the invention.

FIG. 4 explains such a configuration.

The safe relief R1 then comprises unsafe relief R0 together with a first main volume V1 that might contain a wire obstacle starting from a first high point of a first upright 4', e.g. a pylon or a post. Furthermore, the safe relief R1 comprises a second main volume V2 that might contain a wire obstacle starting from the second high point 5 of a second upright 5', in particular a pylon or a post.

In addition, the link line connecting the first high point to the second high point presents a link length D1 that is shorter than the predetermined length L of the generator line segments of the first and second main volumes V1 and V2. Under such circumstances, the safe relief R1 has a secondary volume V3 defined by:

- the link line 6 which is given a predetermined thickness, e.g. one meter;
- an orthogonal projection 7 of the link line 6 onto the unsafe relief, which is given said predetermined thickness;
- a first side wall having said predetermined thickness and passing via the first high point, being directed in the gravity direction to represent the first upright 4; and
- a second side wall having said predetermined thickness and passing through the second high point, being directed in the gravity direction in order to represent the second upright 5.

Finally, during a final step P4 shown in FIG. 1, it is possible to record the safe relief in order to obtain a reusable safe database.

Figure 5:
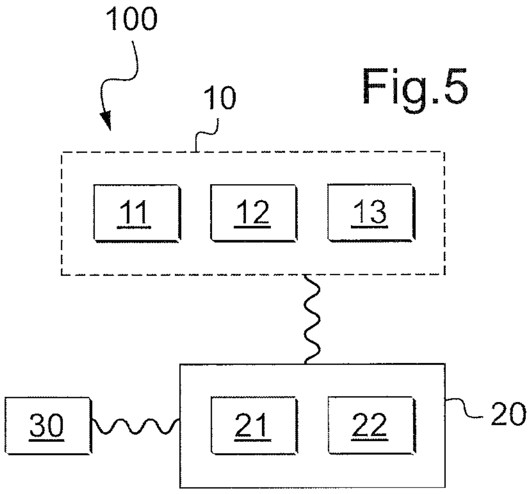
FIG. 5 is a diagram explaining a device of the invention.

FIG. 5 represents a device for flying an aircraft at low altitude in safe manner and suitable for implementing the method of the invention.

This device is provided with a primary database storing unsafe relief R0 together with localized obstacles overlying the unsafe relief R0. It should be observed that the device may be arranged in an aircraft 100.

Furthermore, the device is provided with a primary computer 20, having a microprocessor or a microcontroller 21 and a memory 22, for example, in order to determine the safe relief by adding to the unsafe relief at least one main volume, or indeed at least one secondary volume. In addition, the device may be provided with interface means 30 enabling an operator to add at least one protection volume.

Furthermore, in an option, the device includes a secondary database 11, obstacle detector means 12, and a secondary computer 13, such as a microcontroller or a microprocessor, for example.

The secondary computer then constructs the primary database 10 by enriching the secondary database with the obstacles as updated by the obstacle detector means.

Naturally, the present invention may be subjected to numerous variations as to its implementation. Although several implementations are described above, it will readily be understood that it is not conceivable to identify exhaustively all possible implementations. Naturally, it is possible to envisage replacing any of the means described by equivalent means without going beyond the ambit of the present invention.

What is claimed is:

1. A computer-implemented method of making a safe relief of a terrain for enabling an aircraft to fly safely at a low altitude above the terrain, the method comprising:

obtaining an unsafe relief of said terrain, wherein said unsafe relief relates to a surface which represents a ground of the terrain, and obtaining a position of a high point representing a top of an obstacle extending upright from the terrain into the low altitude above the terrain, by making use of a primary database of said terrain containing information representing said unsafe relief and said obstacle; and combining with said unsafe relief a main volume that is defined between (i) a main volume base on the unsafe relief and (ii) an envelope, so as to obtain the safe relief of said terrain for overflying that contains at least said unsafe relief and said main volume, said main volume base having an area defined by a closed peripheral curve on said unsafe relief, the closed peripheral curve extending on said unsafe relief around an axis extending in a gravity direction through said high point and said unsafe relief, said envelope being generated using a segment of predetermined length extending from said high point to a second point that is on said closed peripheral curve and is moved along the entirety of said closed peripheral curve;

wherein at least two high points overlie said terrain, a link line connects together said two high points, the link line having a predetermined thickness and a link length shorter than said predetermined length;

the method further including adding a secondary volume to said unsafe relief, the secondary volume lying between said link line and an orthogonal projection of said link line onto said unsafe relief in order to optimize said safe relief.

2. The method according to claim 1, wherein said obstacle is a first upright that is connected to a second upright by a wire, wherein said predetermined length is equal to a maximum allowed length of the wire.

3. The method according claim 1, wherein a secondary database is used that contains only said unsafe relief, and said secondary database is enriched with the help of obstacles detected by obstacle detector means in order to obtain said primary database.

4. The method according to claim 1, further comprising adding a protection volume to the unsafe relief, the protection volume being determined and positioned by an operator in order to optimize said safe relief.

5. The method according to claim 1, wherein said safe relief is recorded in order to provide a reusable safe database of said terrain that includes wire and non-wire obstacles.

6. The method according to claim 1, wherein the obstacle is a structure for supporting at least one of wiring and cabling above the terrain.

7. A device for making a safe database in order to fly safely at a low altitude in an aircraft, wherein the device comprises:

a primary database including information representing at least an unsafe relief of a terrain for overflying and a position of a high point of a top of an obstacle overlying said unsafe relief, wherein said unsafe relief relates to a surface which represents a ground of the terrain; and a primary computer for combining a main volume with said unsafe relief, the main volume being defined between a main volume base placed on the unsafe relief and by an envelope, thereby obtaining a safe relief of said terrain for overflying containing at least said unsafe relief and said main volume, said main volume base having an area defined by a closed peripheral curve on said unsafe relief, the closed peripheral curve extending on said unsafe relief around an axis extending in a gravity direction through said high point and said unsafe relief, said envelope being generated by using a segment of a predetermined length extending from said high point to a second point that is on said closed peripheral curve and is moved along the entirety of said closed peripheral curve;

wherein at least two high points overlie said terrain, a link line connects together said two high points, the link line having a predetermined thickness and a link length shorter than said predetermined length;

the primary computer further for adding a secondary volume to said unsafe relief, the secondary volume lying between said link line and an orthogonal projection of said link line onto said unsafe relief in order to optimize said safe relief.

8. The device according to claim 7, comprising:

a secondary database containing solely said unsafe relief;

an active obstacle detector; and a secondary computer for enriching said secondary database with obstacles detected by the obstacle detector in order to obtain said primary database.

9. The device according to claim 7, including an interface to enable an operator to add a protection volume to the unsafe relief, the protection volume being determined and positioned by said operator in order to optimize said safe relief.

10. The device according to claim 7, wherein the obstacle is a structure for supporting at least one of wiring and cabling above the terrain.

* * * * *